US008212172B2

(12) United States Patent
Haberler et al.

(10) Patent No.: US 8,212,172 B2

(45) Date of Patent: Jul. 3, 2012

(54) VAPOR PLASMA BURNER

(75) Inventors: Wolfgang Haberler, Scharnstein (AT); Michal Heinrich, Frydek-Mistek (CZ); Harald Langeder, Pettenbach (AT); Heribert Pauser, Grafenwörth (AT); Florian Silbermayr, Eberstalzell (AT); Max Stöger, Vorchdorf (AT)

(73) Assignee: Fronius International GmbH, Pettenbach (AT)

( * ) Notice: Subject to any disclaimer, the term of this patent is extended or adjusted under 35 U.S.C. 154(b) by 1107 days.

(21) Appl. No.: 11/990,814

(22) PCT Filed: Sep. 6, 2006

(86) PCT No.: PCT/AT2006/000366

§ 371 (c)(1),
(2), (4) Date: Feb. 21, 2008

(87) PCT Pub. No.: WO2007/028183

PCT Pub. Date: Mar. 15, 2007

(65) Prior Publication Data

US 2009/0230096 A1 Sep. 17, 2009

(30) Foreign Application Priority Data

Sep. 9, 2005 (AT) ................................ A 1477/2005

(51) Int. Cl.
*B23K 10/00* (2006.01)

(52) U.S. Cl. ........... 219/121.49; 219/121.5; 219/121.52; 219/121.54; 315/111.21

(58) Field of Classification Search ............. 219/121.36, 219/121, 121.48, 121.5, 121.52, 121.54, 219/121.59, 121.39, 75; 315/111.21; 313/231.31, 313/231.41

See application file for complete search history.

(56) References Cited

U.S. PATENT DOCUMENTS 3,004,189 A 10/1961 Giannini
3,217,133 A 11/1965 Mattmuller
3,242,305 A 3/1966 Kane et al.

(Continued)

FOREIGN PATENT DOCUMENTS

CN 2544872 4/2003

(Continued)

OTHER PUBLICATIONS

International Search Report.

(Continued)

*Primary Examiner* — Mark Paschall

(74) *Attorney, Agent, or Firm* — Collard & Roe, P.C.

(57) ABSTRACT

The invention relates to a vapor plasma burner (6) comprising a burner handle (6*a*) and a burner base (6*b*). Inside the burner base (6*b*), a liquid feed pipe (32), a heating device (26), a burner chamber (27), a cathode (22), connected to a cathode support (28), and an anode (24) which is configured as a nozzle (23) and has an exit opening (25) are arranged. The invention also relates to a cathode (22) and to a nozzle (23) for such a vapor plasma burner (6). The aim of the invention is to provide a vapor plasma burner (6) that can be optimally ignited and the wearing parts of which can be easily removed. For this purpose, the cathode support (28) is configured together with the cathode (22) as an axially displaceable piston and is connected to a spring element (30) in such a manner that the cathode (22), in the rest position, is forced against the nozzle (23) and that the cathode support (28) communicates with the liquid feed line (32) in such a manner that during operation, the cathode (22) is lifted off the nozzle (23) when water is supplied so that an electric arc can be ignited between the cathode (22) and the anode (24).

37 Claims, 5 Drawing Sheets

U.S. PATENT DOCUMENTS

Figure 1:
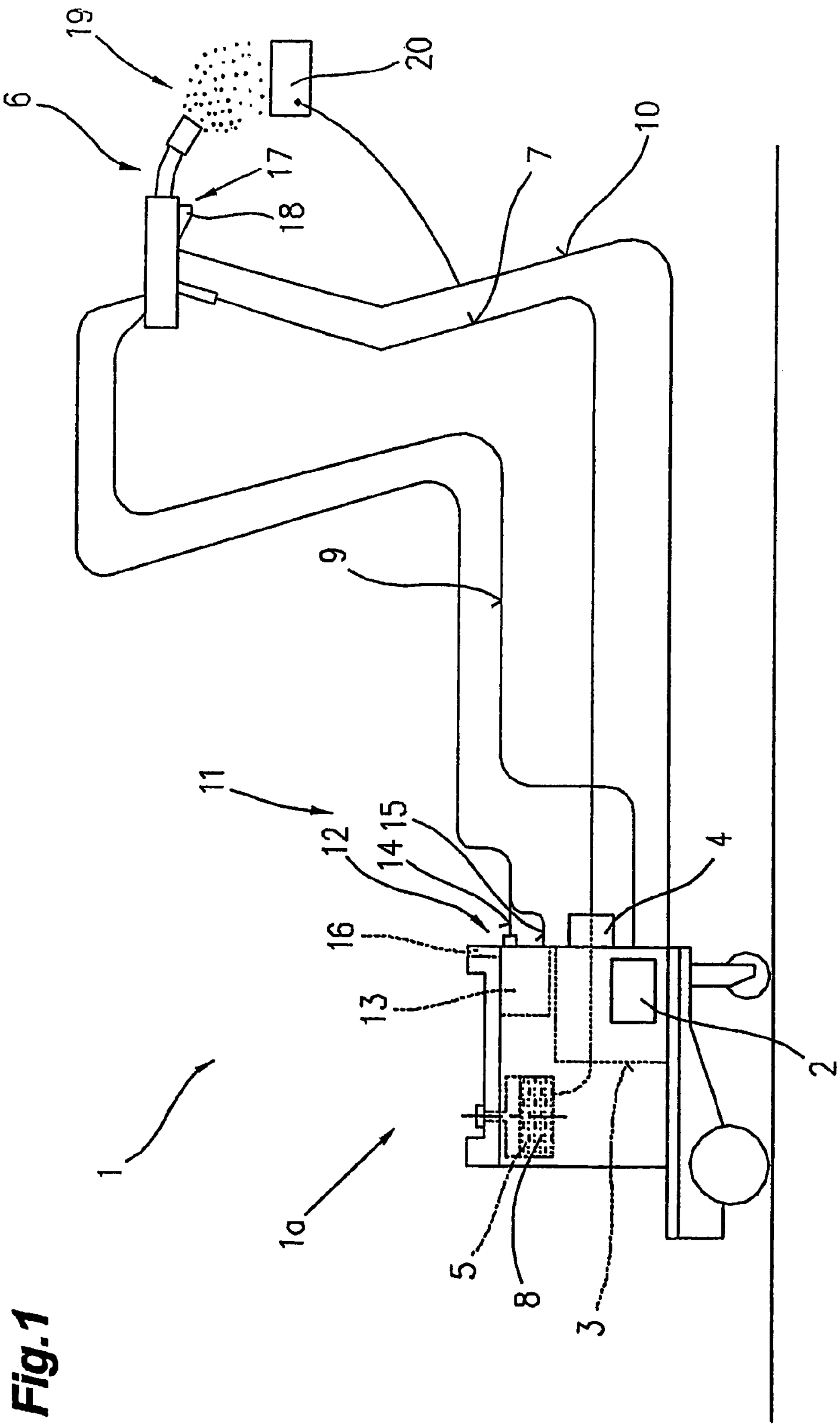

| | | | |
|---|---|---|---|
| 4,902,871 | A | 2/1990 | Sanders et al. |
| 5,164,569 | A | 11/1992 | Porra et al. |
| 6,084,199 | A | 7/2000 | Lindsay et al. |
| 6,326,581 | B1 | 12/2001 | Laimer et al. |
| 6,815,632 | B2 | 11/2004 | Dallaville |

FOREIGN PATENT DOCUMENTS

| | | |
|---|---|---|
| DE | 41 38 897 | 6/1992 |
| DE | 198 25 555 | 12/1999 |
| DE | 100 08 255 | 2/2001 |
| EP | 0 490 882 | 6/1992 |
| EP | 0 640 426 | 3/1995 |
| EP | 1 050 200 | 11/2000 |
| JP | H02501904 | 6/1990 |
| JP | 2004-268089 | 9/2004 |
| WO | WO 88/05704 | 8/1988 |
| WO | WO 99/38365 | 7/1999 |

OTHER PUBLICATIONS

Chinese Office action dated Apr. 29, 2011 in Chinese Patent Application No. 200680032653.1 (With English translation of same).

Japanese Examination Report dated Mar. 13, 2012 in JP 2008-529412 with English Translation.

VAPOR PLASMA BURNER

CROSS REFERENCE TO RELATED APPLICATIONS

Applicants claim priority under 35 U.S.C. §119 of Austrian Application No. A 1477/2005 filed Sep. 9, 2005. Applicants also claim priority under 35 U.S.C. §365 of PCT/AT2006/000366 filed Sep. 6, 2006. The international application under PCT article 21(2) was not published in English.

The present invention relates to a vapor plasma burner comprising a burner handle and a burner base, wherein inside the burner base a liquid feed pipe, a heating device, a burner chamber, a cathode connected to a cathode support, and an anode which is configured as a nozzle and has an exit opening are arranged.

Moreover, the present invention relates to a cathode and a nozzle for such vapor plasma burner.

In vapor plasma burners of the present type, an arc between a negatively charged cathode and a positively charged anode, which is configured as a nozzle at the burner tip, is ignited via a source of electric power. Liquid or water is conducted via a liquid feed pipe from a tank to the burner, where it is vaporized by means of a heating device and conducted to the burner chamber via channels, in which chamber it is used as a plasma producing medium and produces plasma. Said plasma beam exits the nozzle currentless and may be used to melt work pieces due to its high energy density. As said plasma beam exits the burner nozzle currentless and no arc is produced between the nozzle and the work piece, even non-conducting materials may be thermally worked. Besides cutting, a vapor plasma burner may also be used to join work pieces.

For example, DE 100 08 255 A1 describes a vapor plasma burner specifically formed to achieve lower energy levels at the plasma burner tip for other applications.

An electric arc plasma torch of the present type, wherein the working fluid tank is integrated in the torch, is described in EP 0 640 426 A1.

EP 1 050 200 B1 describes a vapor plasma burner specifically formed to make the operating time for cutting processes as long as possible.

The object of the present invention is to provide a vapor plasma burner as mentioned above which allows ignition of the arc to be as exact a possible and which may be cooled as well as possible for optimum operation.

Another object of the present invention is to provide a cathode and a nozzle for a vapor plasma burner as mentioned above which allow optimum ignition and may be well cooled for optimum operation conditions and operation as long as possible.

Said first object of the present invention is achieved by a vapor plasma burner as mentioned above, wherein the cathode support is configured together with the cathode as an axially displaceable piston and is connected to a spring element, so that the cathode, in the rest position, is forced against the nozzle, and wherein the cathode support communicates with the liquid feed pipe in such a manner that, during operation, the cathode is lifted off the nozzle when liquid or water is supplied, so that an electric arc may be ignited between the cathode and the anode. The present vapor plasma burner is characterized by an axially displaceable cathode, thus allowing contact ignition. In the rest position, the cathode contacts the anode, thus producing an electric short circuit. During operation of the vapor plasma burner, the cathode is automatically lifted off by the water, thus producing an electric potential between the cathode and the anode allowing an arc to be produced between the cathode and the anode. Another advantage is that hardly any water may leak from the burner in the rest position because the nozzle is almost completely sealed. Because the cathode is lifted off from the anode by the working medium of the plasma burner, the arc may only be ignited if medium is present.

The object of the present invention is achieved also by a vapor plasma burner as mentioned above, wherein the liquid feed pipe towards the burner chamber located in the burner base is configured in such a way that the supplied liquid first runs along the cathode support via a cooling channel and then along the heating device towards the burner chamber. Thus, a vapor plasma burner is provided wherein the cathode is better cooled by the liquid or water. As the liquid absorbs the heat, it requires less energy for subsequent vaporization.

Advantageously, a space limited by a piston element is arranged around the cathode support, which space is connected to the liquid feed pipe, so that said space is filled as liquid is supplied and said cathode support is lifted off said nozzle together with said cathode.

In order to achieve almost tight sealing of the nozzle in the rest position of the plasma burner and to avoid damaging the cathode or nozzle by distribution of forces, the shape of the cathode tip preferably corresponds to the shape of the inside of the nozzle. Preferably, sharp edges or corners are avoided when shaping said cathode and nozzle.

The spring element forcing the cathode against the nozzle in the rest position is preferably formed by a helical spring. This is a simple, solid, and cost-efficient solution.

As the cathode and the cathode support are axially displaceable, sealing rings are preferably arranged on said cathode support. Said sealing rings are made of elastic material tolerating the usual vapor plasma burner temperatures, e.g. silicone or Teflon composite materials. Said sealing ring(s) may also serve to center said cathode support in the surrounding cylinder of said vapor plasma burner.

In order to keep the current-carrying cathode from contacting other vapor plasma burner components, the cathode support has an electrically insulating coating. Said coating should provide good electric insulation but also good thermal conductivity to conduct off the resulting heat. In addition, said insulating coating is preferably sealed.

According to another feature of the present invention, the cathode of the vapor plasma burner is made of copper or a copper alloy.

In order to protect said cathode from high temperatures, it may be, at least partially, provided with an electric insulation, particularly a ceramic coating.

The cathode is preferably connected to the cathode support via a thread to allow swift exchange of said cathode. Said thread is relatively long to allow good heat transfer from said cathode to said cathode support.

Said cathode preferably has a stop flange which keeps said cathode from being screwed too far into said cathode support, which might lead to thread damage. Moreover, said stop flange seals the connection between cathode and cathode support and keeps the working medium from entering.

Preferably, an anti-distortion means is arranged on the cathode support to keep said cathode support from being distorted when mounting or removing said cathode. Said means is e.g. formed by an axis arranged in a transverse hole of said cathode support.

In order to achieve sufficient cooling of the vapor plasma burner, the cathode support is surrounded by at least one cooling channel communicating with the liquid feed pipe, so that a liquid, particularly water or a suitable water mixture, may be used as a cooling agent. The liquid feed pipe conducts said liquid into a chamber around said cathode support and along said at least one cooling channel, resulting in said cathode support being cooled by said liquid. As the liquid of said vapor plasma burner is used as the cooling medium, it is not necessary to provide a separate cooling circuit having its own cooling medium.

Said at least one cooling channel runs along and around said cathode support, preferably in a spiral way. This ensures that the water is evenly distributed around said cathode support. Advantageously, in addition to said cooling channel a small annular gap around the entire cathode support remains free for said cooling medium to enter. This ensures wetting of the entire cathode support surface and avoids local overheating of said cathode support.

In order to keep the vapor plasma burner compact in size, the liquid flowing around said cathode support for cooling is returned to the heating device via a return channel.

Said heating device preferably has a spiral channel to conduct said liquid, in which channel it is vaporized. Said spiral channel has the advantage that the liquid, which is vaporized using a heating device usually comprising an electrical heater, is vortexed and arrives in said burner chamber is this vortexed state.

In order to avoid operation of said vapor plasma burner with the housing not properly arranged, a protective switch may be provided which may only be actuated when the housing is properly arranged. Said protective switch may be formed by a micro-push button actuated by the housing properly screwed on or mounted. It is possible to supply liquid and switch on electricity only if said protective switch is closed.

In order to also allow cooling of the vapor plasma burner nozzle, said nozzle may also have cooling channels to conduct a cooling fluid. Said nozzle may also be cooled to a certain extent by connecting said nozzle to the housing via a thread. Thus, the heat produced at said nozzle may be conducted to said housing via said thread.

In order to protect the nozzle from mechanic damage and to keep a certain minimum distance from the work piece, a spacer may be arranged on said nozzle.

Said spacer is preferably arranged as a ring around the exit opening.

Said spacer may also be prepared integrally with the nozzle.

Said spacer may also be formed by an attachable wire bow. This is a particularly simple and cost-efficient solution. Said spacer may also be formed by an attachable protective tube.

Said spacer is made of or coated with electrically insulating material. Thus, the current-carrying anode will be insulated from its environment in case the arc is not transmitted.

The object of the present invention is achieved by a cathode as mentioned above for a vapor plasma burner as mentioned above, wherein the shape of the cathode tip essentially corresponds to the shape of the inside of the nozzle.

Further features are apparent from the above description of the vapor plasma burner.

Finally, the object of the present invention is achieved by a nozzle for a vapor plasma burner as mentioned above having an opening for the plasma beam to exit, wherein a spacer is arranged in the vicinity of said exit.

Further features are apparent from the above description of the vapor plasma burner.

Figure 2B:
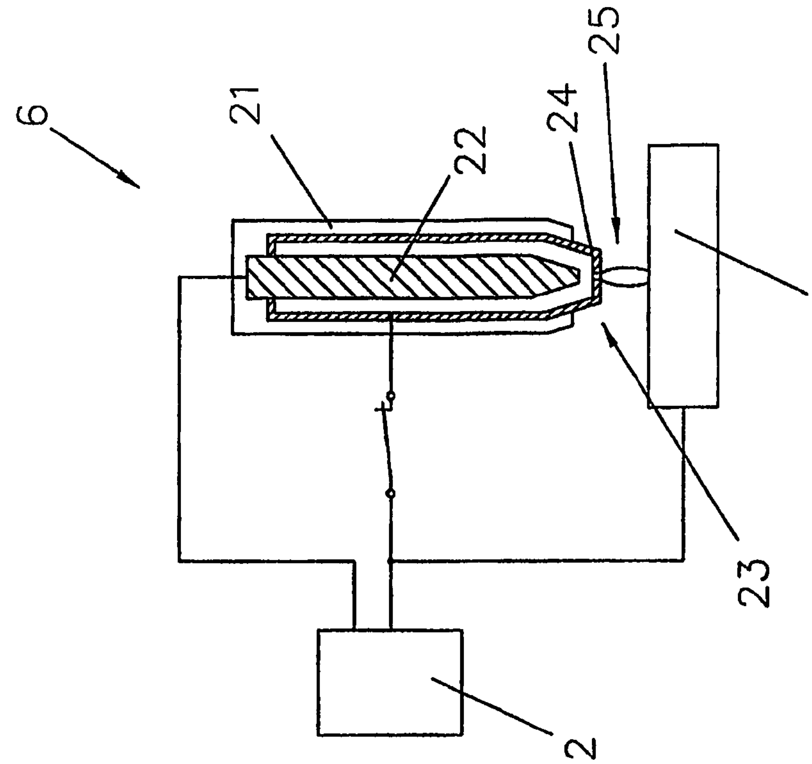
Figure 2A:
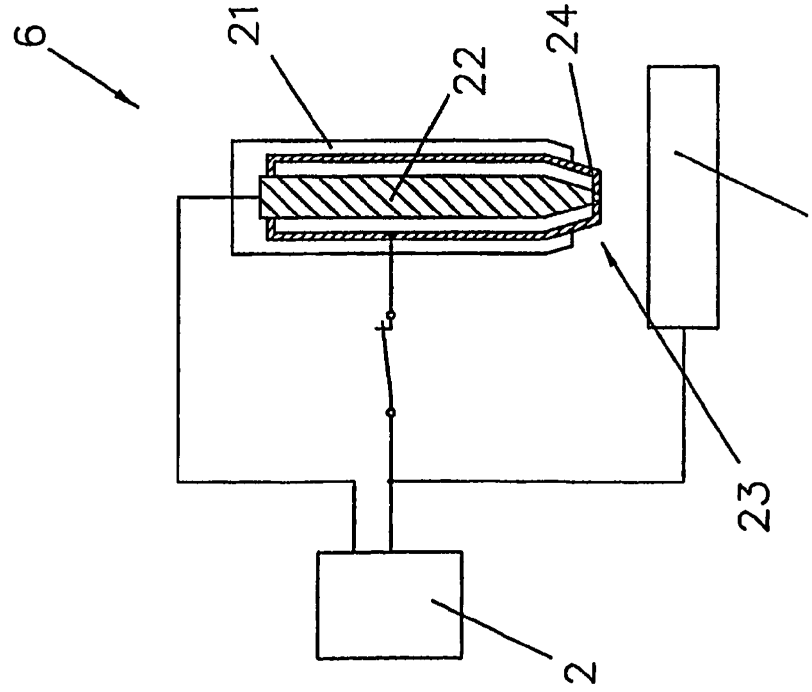
Figure 3A:
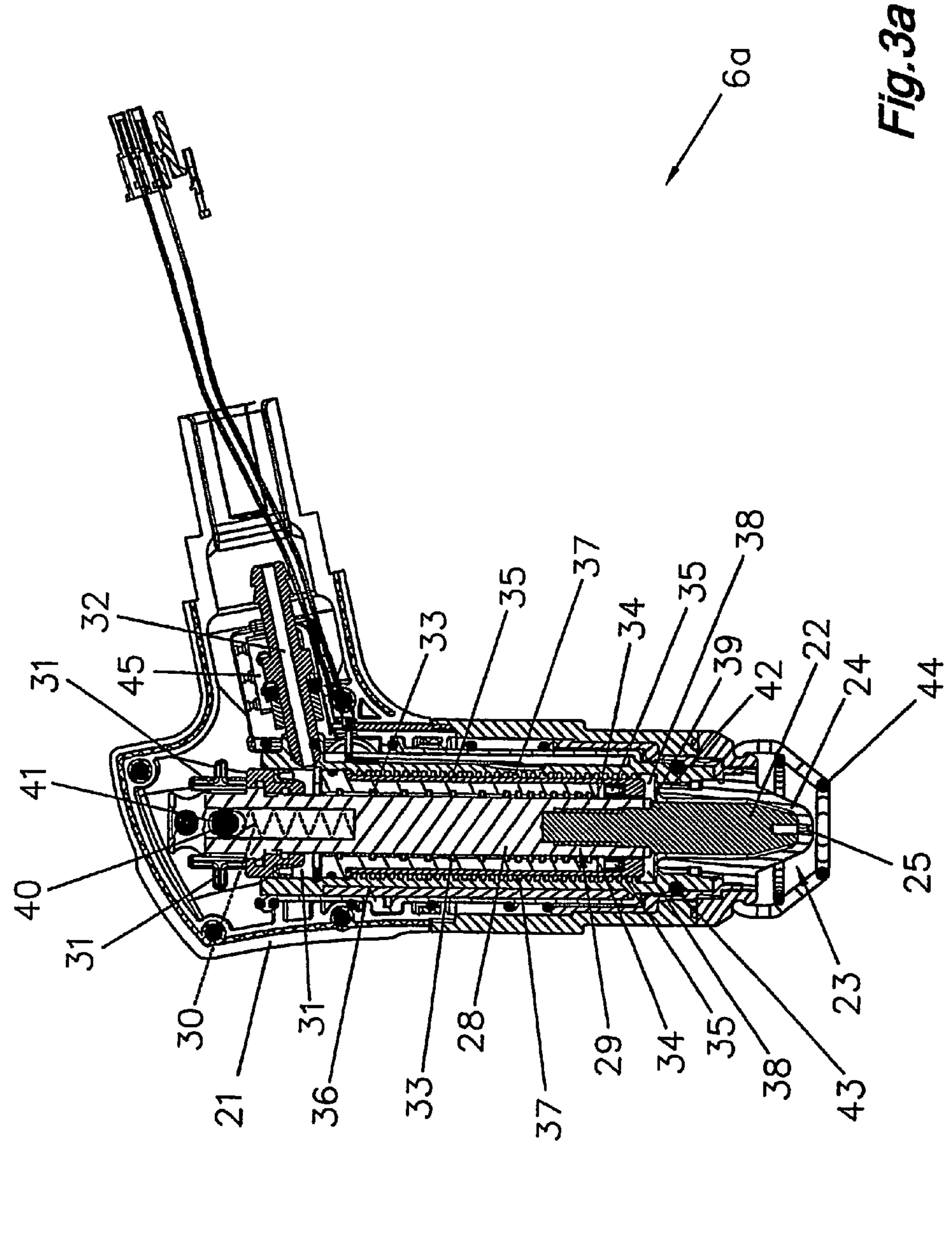
Figure 3B:
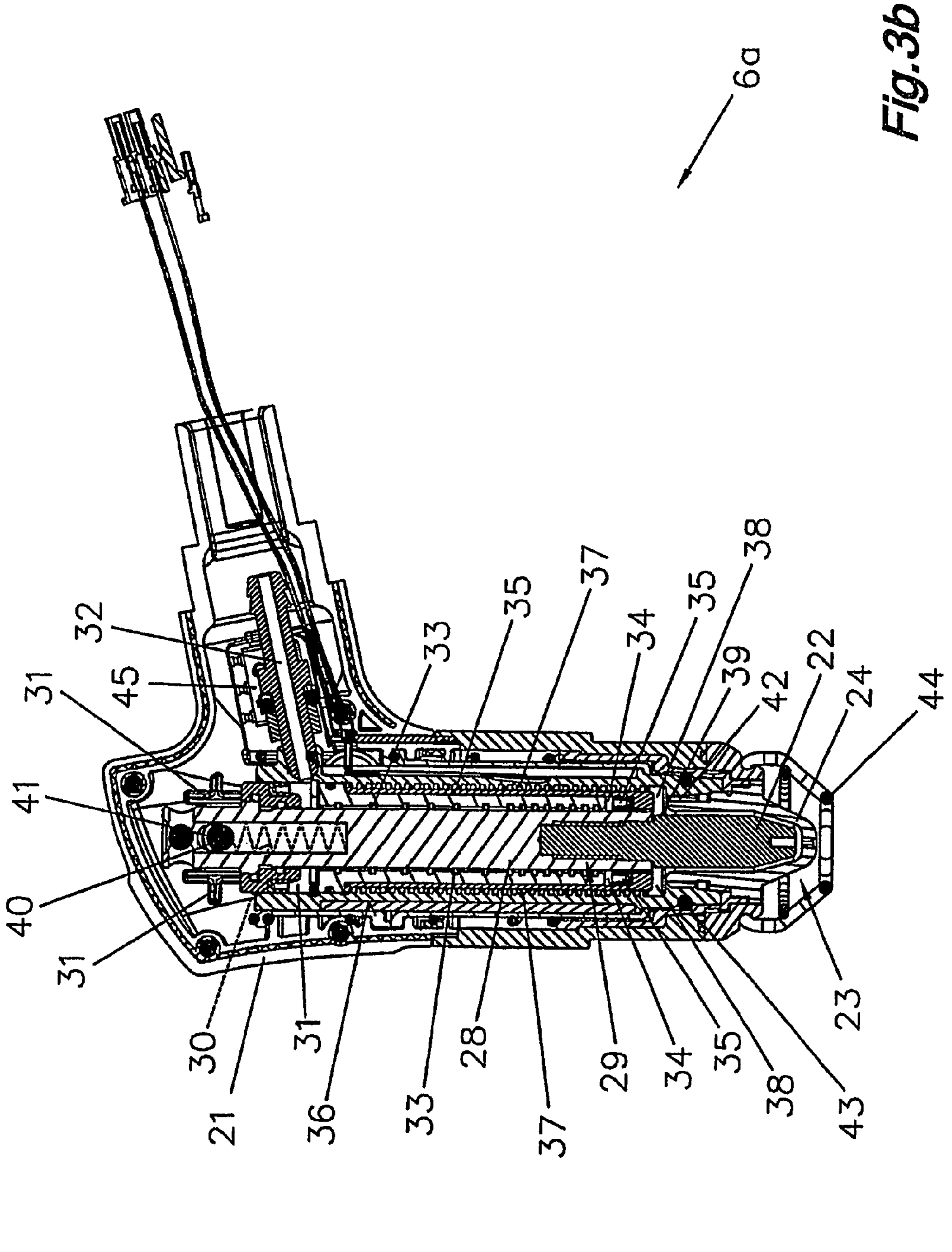
Figure 4:
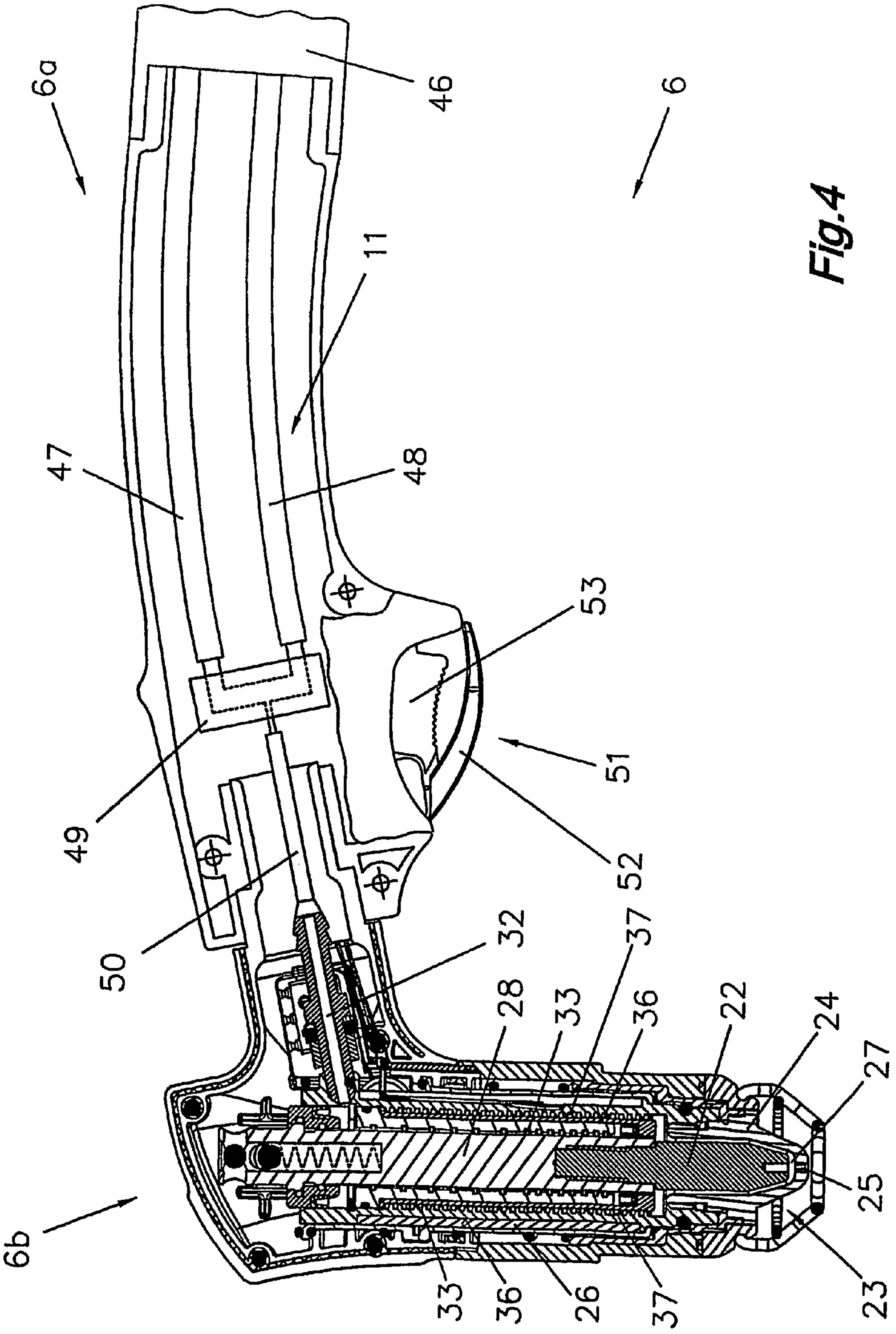

The present invention will now be explained in greater detail using the attached drawings, wherein FIG. 1 is a schematic representation of a vapor cutter;

FIGS. 2*a* and 2*b* are schematic representations of a vapor plasma burner having an axially displaceable cathode according to the present invention in the rest position and in the operating position;

FIGS. 3*a* and 3*b* are sections through one embodiment of a vapor plasma burner in the rest position and in the operating position; and FIG. 4 is a schematic representation of a vapor plasma burner having a burner handle and a burner base.

FIG. 1 shows a vapor cutter 1 having a basic device 1*a* for vapor cutting. Said basic device 1*a* comprises a current source 2, a control device 3, and a blocking element 4 assigned to said control device 3. Said blocking element 4 is connected to a container 5 and a vapor plasma burner 6, which vapor plasma. burner 6 comprises a burner handle 6*a* and a burner base 6*b*, via a supply pipe 7 so that said vapor plasma burner 6 may be supplied with liquid 8 located in said container 5. Said vapor plasma burner 6 is supplied with electric energy from said current source 2 via cables 9, 10.

For cooling, said vapor plasma burner 6 is connected to a liquid container 13 via a cooling circuit 11 optionally equipped with a flow control device 12. When said burner 6 or said basic device 1*a* is put into operation, said cooling circuit 11 may be started by said control device 3, thus cooling said burner 6 via said cooling circuit 11. Said burner 6 is connected to said liquid container 13 via cooling pipes 14, 15 to form said cooling circuit 11.

Moreover, said basic device 1*a* may have an input and/or display device 16 for setting and displaying various parameters and modes of operation of said vapor cutter 1. The parameters set via said input and/or display device 16 are communicated to said control device 3, which will activate the individual vapor cutter 1 components accordingly.

In addition, said vapor plasma burner 6 may have at least one operating element 17, particularly a push button 18. From said operating element 17, particularly said push button 18, a user may order said control device 3 from said burner 6 to start or conduct a vapor cutting process by activating and/or deactivating said push button 18. Furthermore, said input and/or display device 16 may e.g. be used for pre-setting, particularly pre-defining the material to be cut, the liquid to be used, and e.g. current and voltage characteristics. Said burner 6 may of course be equipped with further operation elements for setting one or more operation parameters of said vapor cutter 1 from said burner 6. Said operating elements may be connected to said basic device 1*a*, particularly said control device 3, directly via lines or via a bus system.

When said push button 18 is actuated, said control device 3 will activate the individual components necessary for vapor cutting. For example, first a pump (not shown), said blocking element 4, and said current source 2 are activated, thus starting supply of said burner 6 with liquid 6 and electric power. Subsequently, said control device 3 will activate said cooling circuit 11, thus allowing cooling of said burner 6. As said burner 6 is supplied with liquid 8 and energy, particularly current and voltage, said liquid 8 in said burner 6 is transformed into high temperature gas 19, particularly plasma, so that said gas 19 exiting said burner 6 may be used to cut a work piece 20.

FIGS. 2*a* and 2*b* are schematic representations of a vapor plasma burner 6 according to the present invention, particularly of a burner nozzle 23, in the rest position and in the operating position. Said vapor plasma burner 6 has a housing 21 containing a cathode 22 connected to a current source 2. The anode 24, configured as a nozzle 23, is connected to the positive pole of said current source 2. In the rest position according to FIG. 2*a*, said cathode 22, which is axially displaceable according to the present invention, is forced against said nozzle 23. In this state, no arc may be ignited between said cathode 22 and said anode 24, because they are short-circuited. The heating device 25 contained in said plasma burner 6 to vaporize the water may already be switched on to pre-heat the working medium.

In order to ignite an arc, i.e. a non-transmitted arc, between said cathode 22 and said anode 24, working fluid (liquid 8 in the present invention) supply is switched on as shown in FIG. 2*b*, thus lifting said axially displaceable cathode 22 from said nozzle 23, and an arc will be ignited between said cathode 22 and said anode 24 if the electric power supply is sufficient. The water vaporized in said heating device is conducted into a burner chamber 27, where it serves as the medium for a plasma beam. Said plasma beam is forced out through the opening 25 of said nozzle 23 and may be used for cutting or joining work pieces 20 due to its high energy density.

FIGS. 3*a* and 3*b* are sections through an embodiment of a vapor plasma burner 6, particularly a burner insert. In FIG. 3*a*, said vapor plasma burner 6 is in the rest position, i.e. said cathode 22 is forced against said anode 24 configured as a nozzle 23. Said vapor plasma burner comprises a housing 21, a heating device 26, and a burner chamber 27, where said vaporized liquid 8 is produced as a medium for said plasma beam exiting through said exit opening 25 of said nozzle 23. Said cathode 22 is connected to a cathode support 28, preferably via a screw thread 29. Said cathode support 28 is forced against said nozzle 23 via a spring 30 (broken line). Said vapor plasma burner 6 is supplied with said liquid 8 via a liquid feed pipe 32. Said cathode 22 is axially displaceable together with said cathode support 28. Said liquid feed pipe 32 is connected to said cathode support 28 in such a way that said cathode 22 is lifted off said nozzle 23 when liquid is supplied, so that an arc may be ignited between said cathode 22 and said anode 24. This is effected by conducting said liquid 8 from said liquid feed pipe 32 into a space around said cathode support 28, which space is. limited by a piston element 31. Due to water pressure, said piston element 31 is forced backwards against the force of said spring 30 together with said cathode support 28 and said cathode 22 as shown in FIG. 3*b*.

Via a cooling channel 33, which is preferably arranged like a spiral around said cathode support 28, said liquid 8 subsequently arrives at a turn-around element 34, which is configured as a sealing ring 35. Said sealing ring 35 also allows central positioning of said axially displaceable cathode support 28. Via a return channel 36, said liquid 8 is returned to said heating device 26 where it is vaporized in a spiral channel 37. Due to the spiral arrangement of said channel 37, said vaporized liquid 8 is vortexed in an annular space 38, which merges into said burner chamber 27. The medium, which may be turned into plasma, is turned into a plasma beam by the arc between said cathode 22 and said anode 24, which beam exits via said exit opening 25 of said nozzle. The thread 29 connecting said cathode 22 and said cathode support 28 is shaped as long as possible in order to guarantee optimum heat transfer from said cathode 22 to said cathode support 28. Said cathode 22 is equipped with a stop flange 39 keeping said cathode 22 from being screwed too far into said cathode support 28. Said cathode 22 may be made of copper or a copper alloy, optionally with a ceramic coating. An anti-distortion means may be provided to protect said cathode support 28 from being distorted when said cathode 22 is screwed on or off. Said anti-distortion means may e.g. be formed by an axis 40 in a transverse hole 41.

Said nozzle 23 is another expendable part that may be connected to said housing 21 or any other part of said vapor plasma burner 6 e.g. via a thread 42 for easy exchange. Said nozzle 23 is sealed against said burner chamber 27 by a sealing ring 43. Said nozzle 23 may be equipped with a spacer 44 that is arranged around said exit opening 25 and protects said nozzle 23 from damage by contacting work piece 20 (not shown). Preferably, said spacer 44, which may be formed by an attachable wire bow or an attachable protective tube, is made of or coated with electrically insulating material.

Finally, a protective switch 45 may be provided in said vapor plasma burner 6 which may only be actuated when the housing 21 is properly arranged. This will ensure that said vapor plasma burner 6 can only be operated if said housing 21 is properly attached, thus effectively preventing injuries resulting e.g. from touching said heating device 26.

FIG. 4 is a schematic representation, partially sectioned, of said entire vapor plasma burner 6, i.e. said burner handle 6*a* and said burner base 6*b*, including the connection of a hose pack 46 (only schematically outlined) comprising all lines and leads.

As can be seen in said figure, a closed cooling circuit 11 is provided in said burner handle 6*a* according to the present invention by connecting cooling circuit feed pipe 47 with cooling circuit return pipe 48, e.g. via a connecting element 49. In addition, said connecting element 49 is equipped with a bypass pipe 50, which is connected to said liquid feed pipe 32 inside said burner base 6*b*, as shown schematically. Preferably, said bypass pipe 50 is of a smaller diameter than said cooling circuit feed pipe 47 and said cooling circuit return pipe 48, so that only a small portion of liquid 8 is taken from said closed cooling circuit 11 inside said burner handle 6*a*. Of course it is possible to provide an appropriate element or valve in said connecting element 49 to electronically or mechanically adjust the amount of liquid to be taken, so that only a certain amount or a certain volume is conducted into said burner base 6*b*. This embodiment of said vapor plasma burner 6 ensures that said burner handle 6*a* will be optimally cooled and makes it impossible for the heat re-transferred from said burner base 6*b* to heat up said burner handle 6*a* to such an extent that a user may be burnt or that the handheld portion of said burner handle 6*a* becomes so hot that a user can not hold it any more. Simultaneously, this embodiment allows considerably higher flow-through velocity in the cooling circuit because said cooling circuit feed pipe 47 and said cooling circuit return pipe 48 may be of a larger diameter than if said cooling circuit 11 were conducted via said burner base 6*b*, because there is less space inside said burner base 6*a*. This also allows more returned heat to be transported off.

Moreover, this allows better return of said liquid 8 from said burner base 6*b* when the cutting process is finished, because pressure decreases and said liquid 8 is therefore automatically drawn back into said cooling circuit. In other words, at the end of the process the pressure inside said cooling circuit feed pipe 47 and said cooling circuit return pipe 48 is reduced while it remains higher inside said burner base 6*b*, particularly inside said liquid feed pipe 32, because its diameter is smaller. Consequently, said liquid 8 flows back from said burner base 6*b*, particularly from said liquid feed pipe 32, into said cooling circuit 11, i.e. into said cooling circuit feed pipe 47 and said cooling circuit return pipe 48, and said heated liquid 8 is immediately transported off via said cooling circuit 11 inside said burner handle 6*a*. This prevents overheating of said burner base 6*b* after the cutting process is finished.

Said bypass pipe 50 may also be of the same cross section or diameter as said cooling circuit feed pipe 47 and said cooling circuit return pipe 48, because the cross section or diameter will be reduced in the burner base 6*b*, particularly in said liquid feed pipe 32, so that only as much of said liquid 8 will reach said burner chamber 27 as is required for a cutting or welding process. The amount of said liquid 8 may be controlled by the pressure.

For the sake of completeness it should be mentioned that additional cables, such as e.g. the current cable for said anode 24 and said cathode 22, and any optional control cables are not shown for the sake of clarity.

Moreover, FIG. 4 shows that said switch 18 is configured as a protective switch 51, thus ensuring that said protective switch 51 may not be actuated when said vapor burner 6 is put down.

Said protective switch 51 is equipped with a safety hook 52 arranged above a switch element 53. Any user intending to actuate said switch element 53 has to first press said safety hook 52 down and forward in order to reach said switch element 53 with his finger. The movement of said safety hook 52 activates a release device, e.g. in the form of a micro-switch (not shown), so that upon actuating said switch element 53 a signal is sent to said control device 3. Said release device ensures that said switch element 53 may only be activated when said safety hook 52 is actuated, and if said safety hook 52 is broken off, said switch element 53 can not be activated.

Basically, discussing the design of said vapor plasma burner 6 it should be mentioned that heat re-transfer is particularly important in the parts in close range to the plasma beam 25 exit to prevent said burner base **6*b* from overheating during operation. For this purpose, said cathode 22 is e.g. shaped accordingly to allow heat to be conducted from the burner chamber 27 area to the area behind said cathode support 28. For this purpose, said cathode 22 has a plane or even front surface in the area of said cathode support 28, and preferably this entire surface is connected to the cathode support 28 material when said cathode support 28 is screwed in. Thus, even the back stop of said cathode 22 serves to optimally conduct off the heat together with said cathode support 28, thus allowing transfer of more thermal energy via said screw thread 29 and the back stop of said cathode 22**.

Furthermore, said cathode support 28 has a coating, particularly a ceramic coating with an additional sealing layer, thus allowing even better heat transfer from said cathode support 28 to said liquid 8 in the parallel cooling canal. Said ceramic coating serves to insulate said cathode support 28 against said liquid 8 or any other contacting parts, while said sealing layer serves to seal said ceramic layer against said liquid 8, keeping any liquid 8 from permeating through said ceramic layer towards said cathode support. Said sealing layer is e.g. resin based, thus providing high temperature resistance. Preferably, said ceramic layer is between 100 μm and 400 μm thick, particularly 200 μm.

The surface of said ceramic coating may have a certain structure, in particular, it may be as rough as possible (surface roughness) to increase its surface area and thus allow better heat transfer. To ensure permanent sealing, said surface roughness in the area of said cathode support 28 is 0.2 μm to 1 μm, preferably 0.5 μm.

Moreover, advantageously, for easy replacement said cathode 22 has a cylindrical part at the thread shoulder, which is between 2 mm and 5 mm long and has an outer diameter corresponding to the inner diameter of said screw thread 29 in said cathode support 28. This allows centering and alignment when said cathode 22 is attached to said cathode support 28, so that said cathode may be easily screwed into said cathode support 28 by simply twisting and applying pressure. Furthermore, said cathode 22 has a centering plane in the area of said thread, which is located in the end part of said thread in the direction of said burner chamber 27, which means that said thread is formed between said cylindrical area and said centering plane. Said centering plane has a certain length of between 2 mm and 8 mm, preferably 4.5 mm.

Finally, it is also possible that said transverse hole 40 does not only serve as an anti-distortion means but also as a defined shoulder to lift off said cathode 22, particularly said cathode support 28.

The invention claimed is:

1. A vapor plasma burner comprising a burner handle a and a burner base), wherein inside said burner base a liquid feed pipe for feeding a working medium of the vapor plasma burner, a heating device, a burner chamber, a cathode connected to a cathode support having an electrically insulating coating, and an anode which is configured as a nozzle and has an exit opening are arranged, wherein said cathode support is configured together with said cathode as an axially displaceable piston and is connected to a spring element in such a manner that said cathode, in a rest position, is forced against said nozzle, and that said cathode support communicates with said liquid feed pipe in such a manner that during operation, said cathode is lifted off said nozzle by the working medium when the working medium is supplied so that an electric arc may be ignited between said cathode and said anode.

2. The vapor plasma burner according to claim 1, wherein a space is arranged around said cathode support, said space being limited by a piston element and being connected to said liquid feed pipe so that said space is filled when a liquid is supplied and said cathode support and said cathode are lifted off said nozzle.

3. The vapor plasma burner according to claim 1, wherein a shape of a tip of said cathode corresponds to an inside shape of said nozzle.

4. The vapor plasma burner according to claim 1, wherein said spring element is formed by a helical spring.

5. The vapor plasma burner according to claim 1, wherein sealing rings are arranged on said cathode support.

6. The vapor plasma burner according to claim 1, wherein said cathode is made of copper or a copper alloy.

7. The vapor plasma burner according to claim 1, wherein said cathode is, at least partially, provided with an electric insulation, particularly a ceramic coating.

8. The vapor plasma burner according to claim 1, wherein said cathode is connected to said cathode support via a thread.

9. The vapor plasma burner according to claim 8, wherein said cathode has a stop flange.

10. The vapor plasma burner according to claim 1, wherein an anti-distortion means is arranged on said cathode support, which means is e.g. formed by an axis arranged in a transverse hole of said cathode support.

11. The vapor plasma burner according to claim 1, wherein said cathode support is surrounded by at least one cooling channel connected to said liquid feed pipe, so that water may be used as a cooling medium.

12. The vapor plasma burner according to claim 11, wherein said at least one cooling channel runs around and along said cathode support, preferably in a spiral way.

13. The vapor plasma burner according to claim 1, wherein a return channel is provided to return said working medium to said heating device.

14. The vapor plasma burner according to claim 1, wherein said heating device has a spiral channel to conduct said working medium.

15. The vapor plasma burner according to claim 1, wherein a protective switch is provided which may be actuated when a housing is properly arranged.

16. The vapor plasma burner according to claim 1, wherein said nozzle has cooling channels to conduct a cooling fluid.

17. The vapor plasma burner according to claim 1, wherein said nozzle is connected to a housing via a thread.

18. The vapor plasma burner according to claim 1, wherein a spacer is arranged on said nozzle.

19. The vapor plasma burner according to claim 18, wherein said spacer is preferably arranged as a ring around said exit opening.

20. The vapor plasma burner according to claim 18, wherein said spacer is prepared integrally with said nozzle.

21. The vapor plasma burner according to claim 18, wherein said spacer is formed by an attachable wire bow.

22. The vapor plasma burner according to claim 18, wherein said spacer is formed by an attachable protective tube.

23. The vapor plasma burner according to claim 18, wherein said spacer is made of or coated with an electrically insulating material.

24. The vapor plasma burner according to claim 1, wherein a shape of a tip of said cathode essentially corresponds to an inside shape of said nozzle.

25. The vapor plasma burner according to claim 24, wherein said cathode is made of copper or a copper alloy.

26. The vapor plasma burner according to claim 24, wherein an at least partial ceramic coating is provided.

27. The vapor plasma burner according to claim 24, wherein a thread is provided for connection with said cathode support.

28. The vapor plasma burner according to claim 24, wherein a stop flange is provided.

29. The vapor plasma burner according to claim 1, wherein said nozzle has an opening for a plasma beam to exit, and wherein a spacer is provided.

30. The vapor plasma burner according to claim 29, wherein said spacer is preferably arranged as a ring around said exit opening.

31. The vapor plasma burner according to claim 29, wherein said spacer is prepared integrally with said nozzle.

32. The vapor plasma burner according to claim 29, wherein said spacer is formed by an attachable wire bow.

33. The vapor plasma burner according to claim 29, wherein said spacer is formed by an attachable protective tube.

34. The vapor plasma burner according to claim 29, wherein said spacer is made of or coated with an electrically insulating material.

35. The vapor plasma burner according to claim 1, wherein the working medium comprises water.

36. A vapor plasma burner comprising a burner handle and a burner base, wherein inside said burner base a liquid feed pipe for feeding a working medium of the vapor plasma burner comprising a supplied liquid, a heating device, a burner chamber, a cathode connected to a cathode support having an electrically insulating coating, and an anode which is configured as a nozzle and has an exit opening are arranged, wherein said liquid feed pipe leading to said burner chamber which pipe is arranged inside said burner base, is configured in such a manner that the supplied liquid is conducted first along said cathode support via a cooling channel and then along said heating device towards said burner chamber.

37. The vapor plasma burner according to claim 36, wherein the working medium comprises water.

* * * * *

UNITED STATES PATENT AND TRADEMARK OFFICE

CERTIFICATE OF CORRECTION

PATENT NO. : 8,212,172 B2
APPLICATION NO. : 11/990814
DATED : July 3, 2012
INVENTOR(S) : Haberler et al.

It is certified that error appears in the above-identified patent and that said Letters Patent is hereby corrected as shown below:

In the Claims:

In Column 8, line 7, Claim 1, after the word "handle" please delete: "a".

In Column 8, line 8, Claim 1, after the first occurrence of the word "base" please delete: ")".

In Column 10, line 23, Claim 36, after the word "chamber" please insert: -- , --.

Signed and Sealed this
Fourteenth Day of May, 2013

Teresa Stanek Rea
*Acting Director of the United States Patent and Trademark Office*